Sept. 2, 1941.          H. J. GARDNER          2,254,521
SOLDER FEEDER FOR SOLDERING IRONS
Filed Dec. 20, 1939
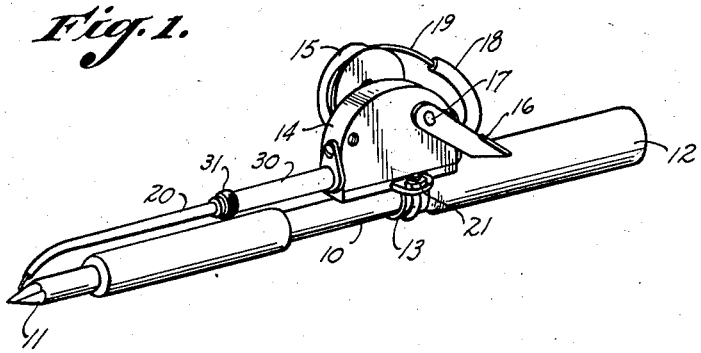
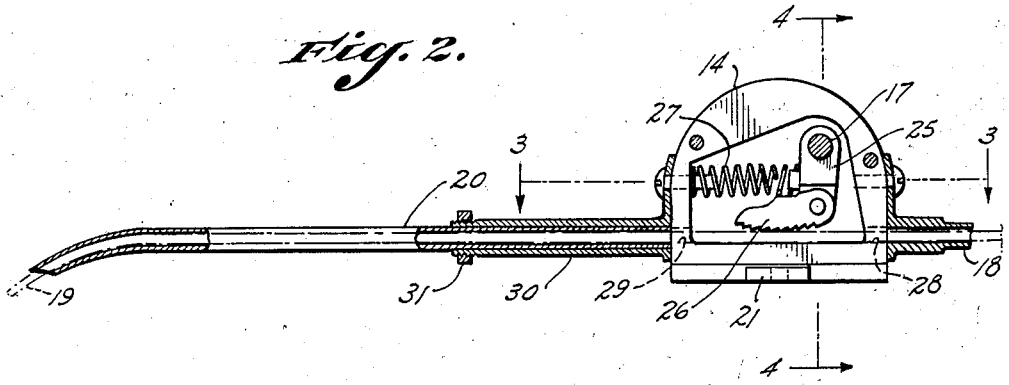
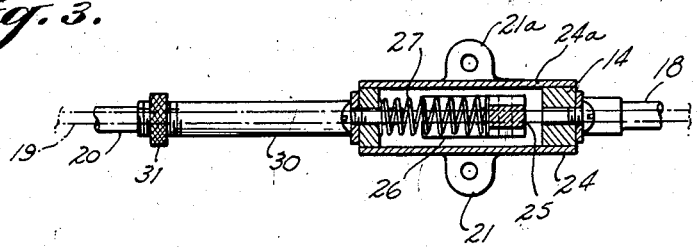
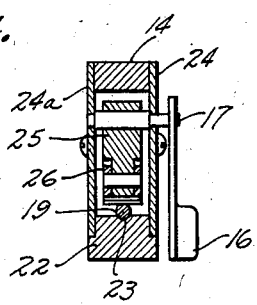
INVENTOR.
Howard J. Gardner,
BY
ATTORNEY.

Patented Sept. 2, 1941

2,254,521

UNITED STATES PATENT OFFICE 2,254,521

SOLDER FEEDER FOR SOLDERING IRONS

Howard J. Gardner, Hermosa Beach, Calif.

Application December 20, 1939, Serial No. 310,150

5 Claims. (Cl. 113—109)

My invention relates generally to a device for feeding solder to the tip of a soldering iron, and more particularly to a device of this type which is designed to be clamped to an electric soldering iron, and to be operated by means of a thumb lever.

I am aware that there have been previous attempts to develop a solder wire feeder, but most of those having a positive feed have been bulky, heavy, and generally inconvenient to use in close quarters. On the other hand, those which were designed to work in restricted space have usually had imperfect means for feeding the solder, and this resulted in a greatly undesirable uncertainty of feed.

It is an object of my invention to provide a solder feeder for a soldering iron which may be attached to an iron of any length or size.

It is a further object of my invention to provide such an attachment which will permit the soldering iron to be used in restricted quarters with no inconvenience.

It is another object of my invention to provide such a device which is light in weight, positive in feed, convenient in use, and inexpensive to manufacture.

These and other objects of my invention will become apparent from the following description of a preferred form thereof, and from the accompanying drawing illustrating that form, in which:

Fig. 1 is a utility view of the feeder attached to a soldering iron,

Fig. 2 is a side elevational view, partly in section, showing the means employed for advancing the solder, Fig. 3 is a cross-sectional view taken at 3—3 in Fig. 2, and Fig. 4 is a cross-sectional view taken at 4—4 in Fig. 2.

Referring now to the drawing, and particularly to Fig. 1 thereof, the numeral 10 indicates generally an electric soldering iron of any conventional type, having a heated tip 11 and a handle 12. Clamped preferably to the handle 12 by means such as a U-bolt 13, is a housing 14 which contains the operative mechanism of the feeder. Means are preferably provided on the right-hand side of the housing 14 for rotatably supporting a spool 15 of solder wire, but as will be pointed out later, this is not an essential. On the other side of the housing 14, there is provided a thumb lever 16 attached to a shaft 17 which extends into the housing. A tubular means 18 guides solder 19 from the spool 15 to the housing 14, and a somewhat similar tubular means 20 guides the solder from the housing to the tip of the iron.

As shown in Figs. 2, 3, and 4, I prefer to form the housing 14 of a single piece of material, such as aluminum, and provide its lower edge with ears 21 and 21a designed to receive the U-bolt 13. The central portion of the housing 14 is cut away to provide space for the operative mechanism, leaving a bed 22 which is preferably provided with a groove 23 in which the solder 19 may rest and be moved forward.

The housing 14 is provided with side plates 24 and 24a attached to the housing by any convenient means, such as screws, and each plate is provided with a bearing for the shaft 17. In this way, the shaft 17 and any portion of the mechanism wholly supported by it is carried by the two side plates 24 and 24a; and should it be desirable to remove the shaft or any of its dependent mechanism, it may easily be done by removing both of the side plates. Thus the mechanism is protected from dirt, dust, grit, and fumes, while at the same time being easily accessible.

Rigidly connected to the shaft 17 and extending in a generally downward direction is an arm 25 which has pivotally mounted on its free or lower end an advancing foot 26. The successful operation of the soldering feeder depends to a large extent on the proper shape of the advancing foot 26, and particularly on the design of its lower surface which bears against and advances the solder wire 19, and hence this is a very important consideration in the design of a satisfactory feeder mechanism. I have found that excellent results are obtained by forming the lower surface of the foot 26 in an arcuate shape and providing serrations across its face, perpendicular to the axis of the solder wire 19. These serrations should be formed in a manner somewhat similar to ratchet teeth, so that as the teeth come in contact with the solder wire 19, the forward sides of the teeth are approximately perpendicular to the surface of the solder wire, while the opposite or rear sides of the teeth form an acute angle with the surface of the soldering wire and also with the forward side of the teeth. In this way, when the advancing foot is urged forward, the teeth dig in to the solder and carry it forward with the foot. When the foot is returned to its original position, the teeth, because of their special shape, act as ratchets and ride up and over the indentations formed in the solder wire. Inasmuch as the solder wire is bent at the forward end of the feeder, as described later, no other holding means are necessary to prevent the solder from moving backward when the foot 26 is returned; and hence a simple device is produced.

Since the foot 26 at its point of attachment to the arm 25 moves in an arc of a circle as the arm is rotated, if the bearing portion of the foot had a flat outline instead of a curved outline, the teeth would contact the solder wire at various angles, and the desirable ratchet effect might be entirely lost. I have, therefore, curved the bottom surface of the foot 26 in an arc in a plane passing through the axis of the solder wire 19 and perpendicular to the bed 22; and thus as the arm 25 moves from its position near the handle 12 toward the tip of the iron 11, the foot normally bears against the solder wire first near its toe and later towards its heel, but at all times presenting the teeth to the surface of the solder wire at a substantially constant angle.

Normally, the design of the foot and its weight combine to keep it in contact with the solder wire at all times and in all positions; but if greater security is desired against the possibility of the foot becoming disengaged from the solder wire, means, such as a spiral spring, can easily be installed to insure that the foot 26 will at all times bear against the solder wire.

A spring 27 bears against the inside forward wall of the housing 14 and against the arm 25, urging the latter toward the rear or handle end of the housing; and in my preferred form, I permit the arm to move backwardly until it forms an acute angle with the forwardly-extending portion of the solder wire. In this way when the arm 25 is first moved forward from its initial or rest position, a downward component of force is exerted on the advancing foot 26, forcing it into the solder 19 and thus providing positive gripping means. Also, it will now be seen that the device automatically adjusts itself so that it will properly feed various sizes of solder wire. This advantage is inherent in the design of the device, since the advancing foot 26, either by reason of its own weight or of the small spring previously mentioned, is forced downwardly until it contacts the solder wire, and hence the size of the latter has no effect upon the proper functioning of the device.

To guide the solder 19 from the spool 15 to the housing 14, I have provided the tubular member 18 which is attached to the rear or handle end of the housing and is curved upwardly and a little to one side so that the solder may freely enter it and be guided through it to a hole 28 in the lower portion of the rear wall of the housing. The hole 28 is aligned with the groove 23, so that solder entering through the hole will be at the proper position to be engaged and moved forward by the advancing foot 26. Where a great amount of soldering is to be done, it may not be convenient to attach a spool of solder to the feeder mechanism, and to provide for such cases, we prefer to make the tubular member 18 detachable from the housing 14. If a comparatively straight tubular member is now substituted for the curved member 18, a large spool of solder may be placed behind the operator, on a bench, on the floor, or in any other convenient location. If the free end of the straight tubular member is flared, no difficulty will be encountered in getting the solder to feed freely into the device.

If such an arrangement is used, the superiority of this type of mechanism again becomes apparent; for if the iron is moved forward, there is no possibility of the solder wire being pulled out of the feeding mechanism, since the teeth of the advancing foot engage the ridges which they have made in the solder at all times, and the solder is thus securely held.

In the forward wall of the housing 14, and aligned with the groove 23, a hole 29 provides a passageway for the solder wire 19 moving toward the tip of the iron 11. Attached to the forward wall of the housing 14 and having an internal diameter somewhat larger than the hole 29, a tubular collar 30 extends outwardly toward the tip of the iron and supports the tubular guiding means 20. While other holding means may be used, I prefer to taper the end of the collar 30, thread it, and then split it for a portion of its length. If a nut or threaded ring 31 is now placed over the end of the collar 30 and tightened, the end of the collar will be compressed and the tubular member 20 will be securely held. By flaring the inside of the tubular member 20 at its end nearest the housing 14, the solder wire 19 may pass along the entire length of the tubular guiding means without encountering any obstruction. A slight curve at the end of the tubular member 20 directs the solder downwardly towards the tip of the iron; and if the tubular member is made of aluminum or other metal to which solder will not adhere, there will be no danger of the member becoming clogged.

By providing an extensible guiding means for the solder, I am able to adjust my feeder to fit a soldering iron of any length; and in addition, I am able to compensate for the shortening of the tip 11 which occurs in the normal course of use of the iron.

The soldering wire feeder I have described may be made from a wide variety of materials, though it is desirable that light-weight materials be used, since unnecessary weight will be tiring to the operator. Molded plastics might be used for the housing 14 and indeed for many other members, but it would seem desirable to make the tubular members 20 of metal, so that there will be no possibility of unpleasant fumes being given off if the member touches the heated tip of the iron 11. Furthermore, the tube should be of some metal, such as aluminum, to which melted solder does not adhere. The advancing foot 26 should be made of a wear-resisting material, and the teeth particularly should be provided with a hard surface, since they are required to be rather sharp to "bite" into the solder, and a soft material would soon become dull.

By attaching the feeding mechanism to the handle of the iron instead of to its shank, the feeder is kept cooler and in addition there is not a heavy weight at the end of the iron which would tend to tire the operator using the apparatus. In addition, the tip portion of the iron is not encumbered with apparatus extending a considerable distance from it, and hence the iron may be used in crowded quarters where the space restrictions are very severe, such as for example, in radios and in switch-board and similar work.

While I have shown and described a preferred form of my invention, I do not wish to be limited to the specific form or arrangement of parts herein described and shown or specifically covered by my claims.

I claim as my invention:

1. A solder wire feeder for soldering irons which includes: a housing adapted to be attached to a soldering iron; a shaft extending transversely through said housing; an arm non-rotatably connected to said shaft within said housing; a foot pivotally connected to the free end of said arm and bearing against a portion of the solder wire within said housing, said foot having an arcuate bearing surface provided with serrations perpendicular to the axis of said solder wire; spring means urging said arm away from the tip of said iron; a thumb lever attached to said shaft outside of said housing and adapted to rotate said shaft and said arm; tubular guiding means for guiding said solder wire to said housing; and a second tubular means for guiding said solder wire from said housing toward the tip of said soldering iron including a tubular collar threaded and split at its outer end and provided with a threaded ring for frictionally clamping a tubular member within said tubular collar, said tubular member being flared at its inner end and curved downwardly at its outer, forward end to guide said solder to the tip of said soldering iron.

2. A solder wire feeder for soldering irons which includes: a housing adapted to be attached to a soldering iron; a shaft extending transversely through said housing; an arm non-rotatably connected to said shaft within said housing; a foot pivotally connected to the free end of said arm and bearing against a portion of the solder wire within said housing, said foot having an arcuate bearing surface provided with serrations perpendicular to the axis of said solder wire; spring means urging said arm away from the tip of said iron; a thumb lever attached to said shaft outside of said housing and adapted to rotate said shaft and said arm; and a tubular means for guiding said solder wire from said housing toward the tip of said soldering iron including a tubular collar threaded and split at its outer end and provided with a threaded ring for frictionally clamping a tubular member within said tubular collar, said tubular member being flared at its inner end and curved downwardly at its outer forward end to guide said solder to the tip of said soldering iron.

3. A solder wire feeder for soldering irons which includes: a housing adapted to be attached to a soldering iron; a shaft extending transversely through said housing; an arm non-rotatably connected to said shaft within said housing; a foot pivotally connected to the free end of said arm and bearing against a portion of the solder wire within said housing, said foot having an arcuate bearing surface provided with serrations perpendicular to the axis of said solder wire; spring means urging said arm away from the tip of said iron; a thumb lever attached to said shaft outside of said housing and adapted to rotate said shaft and said arm; tubular guiding means for guiding said solder wire to said housing; and a second tubular means for guiding said solder wire from said housing toward the tip of said soldering iron including a tubular collar, and means for clamping a tubular member within said tubular collar, said tubular member being flared at its inner end and curved downwardly at its outer forward end to guide said solder to the tip of said soldering iron.

4. A solder wire feeder for soldering irons which includes: a housing adapted to be attached to a soldering iron; a shaft extending transversely through said housing; an arm non-rotatably connected to said shaft within said housing; a foot pivotally connected to the free end of said arm and bearing against a portion of the solder wire within said housing, said foot having an arcuate bearing surface provided with serrations perpendicular to the axis of said solder wire; spring means urging said arm away from the tip of said iron; a thumb lever attached to said shaft outside of said housing and adapted to rotate said shaft and said arm; and a tubular means for guiding said solder wire from said housing toward the tip of said soldering iron including a tubular collar and means for clamping a tubular member within said tubular collar, said tubular member being flared at its inner end and curved downwardly at its outer forward end to guide said solder to the tip of said soldering iron.

5. A solder wire feeder for soldering irons which includes: a housing adapted to be attached to a soldering iron; a shaft extending transversely through said housing; an arm non-rotatably connected to said shaft within said housing; a foot pivotally connected to the free end of said arm and bearing against a portion of the solder wire within said housing, said foot having an arcuate bearing surface provided with serrations perpendicular to the axis of said solder wire; means to rotate said shaft and said arm; and a tubular means for guiding said solder wire from said housing toward the tip of said soldering iron including a tubular collar threaded and split at its outer end and provided with a threaded ring for frictionally clamping a tubular member within said tubular collar, said tubular member being flared at its inner end and curved downwardly at its outer forward end to guide said solder to the tip of said soldering iron.

HOWARD J. GARDNER.